(12) United States Patent
Han et al.

(10) Patent No.: US 7,706,331 B2
(45) Date of Patent: Apr. 27, 2010

(54) METHOD FOR PERFORMING A HANDOVER FROM A WCDMA SYSTEM TO A CDMA SYSTEM IN A MULTI-MODE MOBILE COMMUNICATION TERMINAL

(75) Inventors: Woo-Sic Han, Anyang-si (KR); Jae-Hoon Kim, Seoul (KR)

(73) Assignee: SKY Teletech Co., Ltd., Seoul (KR)

( * ) Notice: Subject to any disclaimer, the term of this patent is extended or adjusted under 35 U.S.C. 154(b) by 666 days.

(21) Appl. No.: 10/983,986

(22) Filed: Nov. 8, 2004

(65) Prior Publication Data

US 2005/0128980 A1 Jun. 16, 2005

(30) Foreign Application Priority Data

| Nov. 11, 2003 | (KR) | 10-2003-0079310 |
| Nov. 21, 2003 | (KR) | 10-2003-0082925 |
| Aug. 23, 2004 | (KR) | 10-2004-0066436 |

(51) Int. Cl.
*H04B 7/216* (2006.01)

(52) U.S. Cl. .................. 370/335; 455/437; 455/436; 455/552.1; 455/442; 455/438; 370/331; 370/332

(58) Field of Classification Search .......... 455/437, 455/436, 552.1, 442; 370/335, 331, 332

See application file for complete search history.

(56) References Cited

U.S. PATENT DOCUMENTS

| 6,963,745 | B2 * | 11/2005 | Singh et al. ............ 455/437 |
| 7,096,020 | B2 * | 8/2006 | Choi et al. ............ 455/439 |
| 2004/0185899 | A1 * | 9/2004 | Hayem et al. ........... 455/552.1 |
| 2005/0073977 | A1 * | 4/2005 | Vanghi et al. ........... 370/335 |

* cited by examiner

*Primary Examiner*—Charles N Appiah
*Assistant Examiner*—Randy Peaches
(74) *Attorney, Agent, or Firm*—H.C. Park & Associates, PLC (57) ABSTRACT

A method of performing a handover from a Wideband Code Division Multiple Access (WCDMA) system to a Code Division Multiple Access (CDMA) system in a multi-mode terminal having a WCDMA module and a CDMA module is disclosed. The method includes determining whether a handover to the CDMA system is necessary during a call through a WCDMA system; acquiring a pilot signal from the CDMA system by activating the CDMA module if it is determined that the handover to the CDMA system is necessary; receiving a sync signal if the pilot signal from the CDMA system is acquired; transmitting information for handover to the WCDMA system through the WCDMA module; allowing the CDMA module to enter a CDMA traffic state using handover information if the handover information is received from the WCDMA system through WCDMA module; and releasing a traffic state of WCDMA module.

24 Claims, 8 Drawing Sheets

METHOD FOR PERFORMING A HANDOVER FROM A WCDMA SYSTEM TO A CDMA SYSTEM IN A MULTI-MODE MOBILE COMMUNICATION TERMINAL

CROSS REFERENCE TO RELATED APPLICATIONS

This application claims priority from and the benefit of Korean Patent Application No. 2003-79310, filed on Nov. 11, 2003, Korean Patent Application No. 2003-82925, filed on Nov. 21, 2003, and Korean Patent Application No. 2004-66436, filed on Aug. 23, 2004, which are all incorporated by reference for all purposes as if fully set forth herein.

BACKGROUND OF THE INVENTION

1. Field of the Invention

The present invention relates generally to a method of performing a handover from a wideband code division multiple access system to a code division multiple access system and, more particularly, to a method of performing a handover by receiving a sync signal through the acquisition of a pilot signal from a code division multiple access network if it is determined that a handover to a code division multiple access system is necessary, requesting the handover from a wideband code division multiple access system using related information, and causing a mobile communication terminal to enter into a code division multiple access traffic mode based on a handover message from the system if the handover message responding to the request is received by the terminal from the system.

2. Description of the Related Art

A mobile communication terminal capable of being used both in a Code Division Multiple Access (CDMA) network and in a Wideband CDMA (WCDMA) network is referred to as a "multi-mode mobile communication terminal." Such a multi-mode mobile communication terminal is equipped with both a Radio Frequency (RF) circuit and modem for a CDMA network and an RF circuit and modem for a WCDMA network so that the terminal can be used in both networks.

In case of switching from one base station to another base station during a call using a mobile communication terminal (i.e., a handover), it is preferable that the switching is performed without an interruption of the call. Conventionally, however, a handover from a WCDMA base station to a CDMA base station is performed by turning off the power of the WCDMA module and turning on the power of the CDMA module in the multi-mode mobile communication terminal. As a result, a call is disconnected when a mobile communication terminal moves from a WCDMA area to a CDMA area.

SUMMARY OF THE INVENTION

Accordingly, the present invention has been made keeping in mind the above problems occurring in the prior art, and an object of the present invention is to provide a method of performing a handover, which can be applied to the case where a multi-mode mobile communication terminal enters into a CDMA network from a WCDMA network.

Another object of the present invention is to provide a method of performing a handover, which can be applied to the case where a multi-mode mobile communication terminal, configured with a modular chip designed in such a way that a connection part for the CDMA RF transmission/reception circuits and the WCDMA RF transmission/reception circuits is shared, enters into a CDMA network from a WCDMA network.

In the present invention, it is determined whether a handover to a CDMA system is necessary during a call using a WCDMA module. For example, when the intensity of a WCDMA signal from a base station of a cell to which a terminal pertains is equal to or lower than a predetermined level and there is no WCDMA signal from a neighboring cell, it may be determined that the handover to the CDMA system is necessary. If it is determined that the handover to the CDMA system is necessary, it is determined whether the terminal can be operated in a CDMA mode. For example, when the terminal is set to a WCDMA-only-mode or is currently situated in a location where the terminal cannot be operated in a CDMA mode, the process of handover to the CDMA system is stopped. Alternatively, whether the handover to the CDMA system is currently available may be inquired from the WCDMA system.

In case where the terminal can be operated in a CDMA mode, the CDMA module is activated and the acquisition of a pilot signal from the CDMA network is attempted. When the pilot signal from the CDMA network is acquired, a sync signal is received. In this case, the pilot signal and the sync signal may be acquired with reference only to a primary frequency. Meanwhile, the activation of the CDMA module can be achieved by causing the CDMA module to exit from a low power mode.

When the sync signal is received from the CDMA network, information for a handover is transmitted to the WCDMA system through the WCDMA module. In this case, the transmitted information may include frequency information, Pseudo Noise (PN) offset information and pilot intensity information. Meantime, during the process of the handover, it is possible to determine again whether a handover to the CDMA system is still necessary when the sync signal is received from the CDMA network and to perform the following handover procedure only if the handover to the CDMA system is still necessary.

The WCDMA system, which has received the information for a handover, consults with the CDMA system about the handover, sets various parameters for the handover of the terminal, and transmits handover information to the terminal. The handover information may include CDMA channel information, frame offset information, code information and early stage power control-related information.

The terminal, which has received the handover information from the WCDMA system, causes the CDMA module to enter into a CDMA traffic state. Furthermore, the handover process is completed by setting the parameters of the resources necessary for a call suitable to the CDMA mode and releasing the traffic state of the WCDMA module. In this case, it is possible to notify the CDMA system of the successful completion of the handover and release the traffic state of the WCDMA module as a response confirming the successful completion of handover.

In case where the handover information is not received within a predetermined period of time after the transmission of the information for handover to the WCDMA system, the handover process to the CDMA system may be cancelled. Meanwhile, even though an idle state is initiated after the initialization of the CDMA module during a WCDMA call to perform a handover to the CDMA system, the terminal does not register a location in the CDMA system. Furthermore, in case where the terminal acquires the sync signal and enters into an idle state, an idle handover may not be performed before an ongoing handover is completed.

The present invention may be applied to a multi-mode terminal in which RF transmission and reception units are shared between the WCDMA and CDMA communications.

In this case, if it is determined that a handover to a CDMA system is necessary, the RF transmission and reception units are set to a CDMA mode and the CDMA module is activated, so that the acquisition of a pilot signal from a CDMA network is attempted. When the pilot signal is acquired, the RF transmission and reception units are set back to a WCDMA mode and the acquired pilot information is transmitted to a WCDMA system through the WCDMA module. Thereafter, when handover information is received from the WCDMA system through the WCDMA module, the RF transmission and reception units are set to a CDMA mode again, and the CDMA module enters into a CDMA traffic state using the received information. Further, the handover process is completed by setting the parameters of the resources necessary for a call suitable to a CDMA mode and releasing the traffic state of the WCDMA module.

Other and further aspect of the present invention will become apparent during the course of the following detailed description and by reference to the attached drawings.

DESCRIPTION OF THE PREFERRED EMBODIMENTS

Reference now should be made to the drawings, in which the same reference numerals are used throughout the different drawings to designate the same or similar components.

Figure 1:
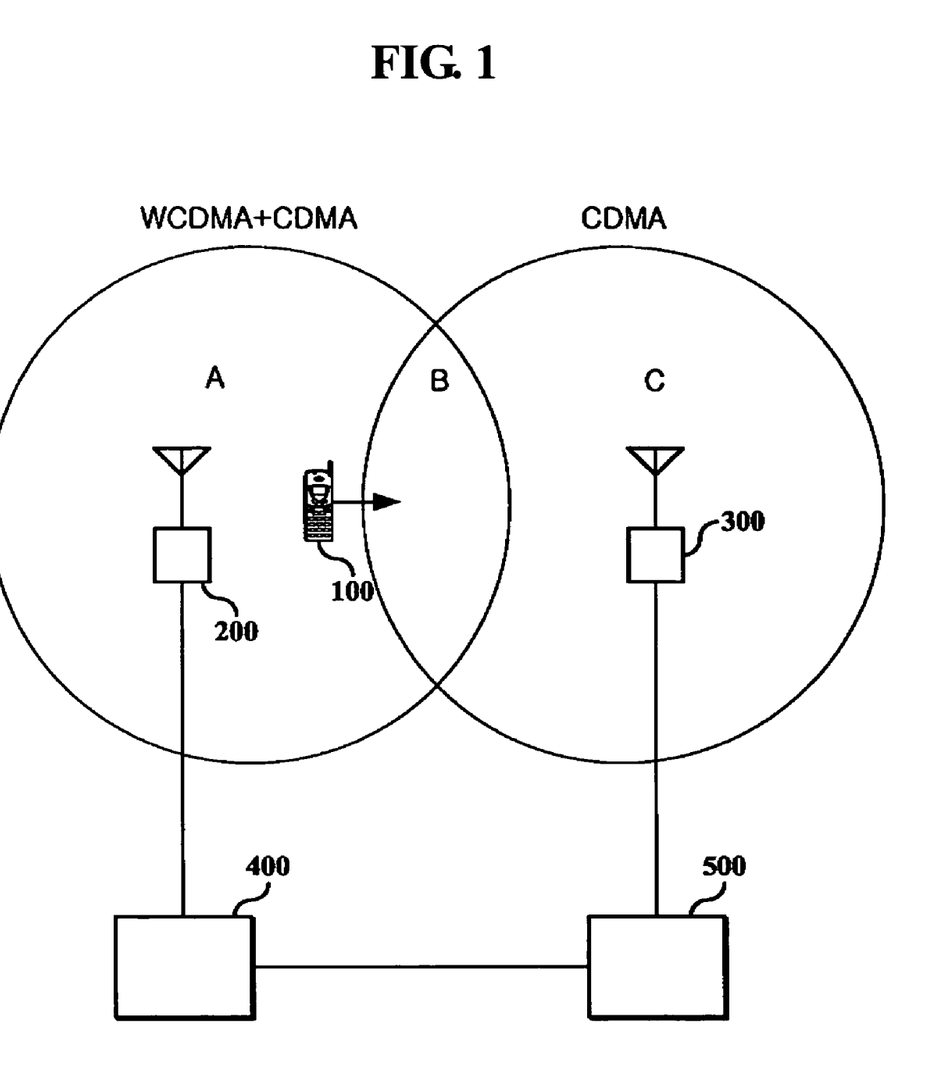
FIG. 1 is a conceptual diagram illustrating a handover from a WCDMA system to a CDMA system.

FIG. 1 is a conceptual diagram illustrating a handover procedure from a WCDMA system 400 to a CDMA system 500. When a dual-mode or multi-mode mobile communication terminal 100 available both in the WCDMA and CDMA systems moves from a WCDMA or combined WCDMA and CDMA area A to a border area B which is again adjacent to a CDMA area C, the received pilot signal level of a WCDMA base station 200 decreases while the pilot signal level of a CDMA base station 300 increases. However, since the terminal 100 currently operates in a WCDMA mode, the terminal cannot detect the pilot signal from the CDMA base station 300.

Meanwhile, the terminal 100 continuously searches for a pilot signal from a neighboring WCDMA base station to prepare for a handover to the neighboring WCDMA base station. When the terminal 100 enters into the area B, a pilot signal from the neighboring WCDMA base station is not searched for because there is no WCDMA base station in the area B. Accordingly, if the pilot signal level of the current WCDMA base station decreases to or below a certain value and the pilot signal level from the neighboring base station is lower than a certain level, the terminal 100 determines that a handover to the CDMA system 500 is necessary.

As illustrated in FIG. 1, a WCDMA base station 200 is connected to a WCDMA system 400, and a CDMA base station 300 is connected to a CDMA system 500. Furthermore, the WCDMA system 400 is connected to the CDMA system 500, so that the WCDMA system 400 and the CDMA system 500 can exchange necessary information when a handover from the WCDMA system 400 to the CDMA system 500 is necessary.

Figure 2:
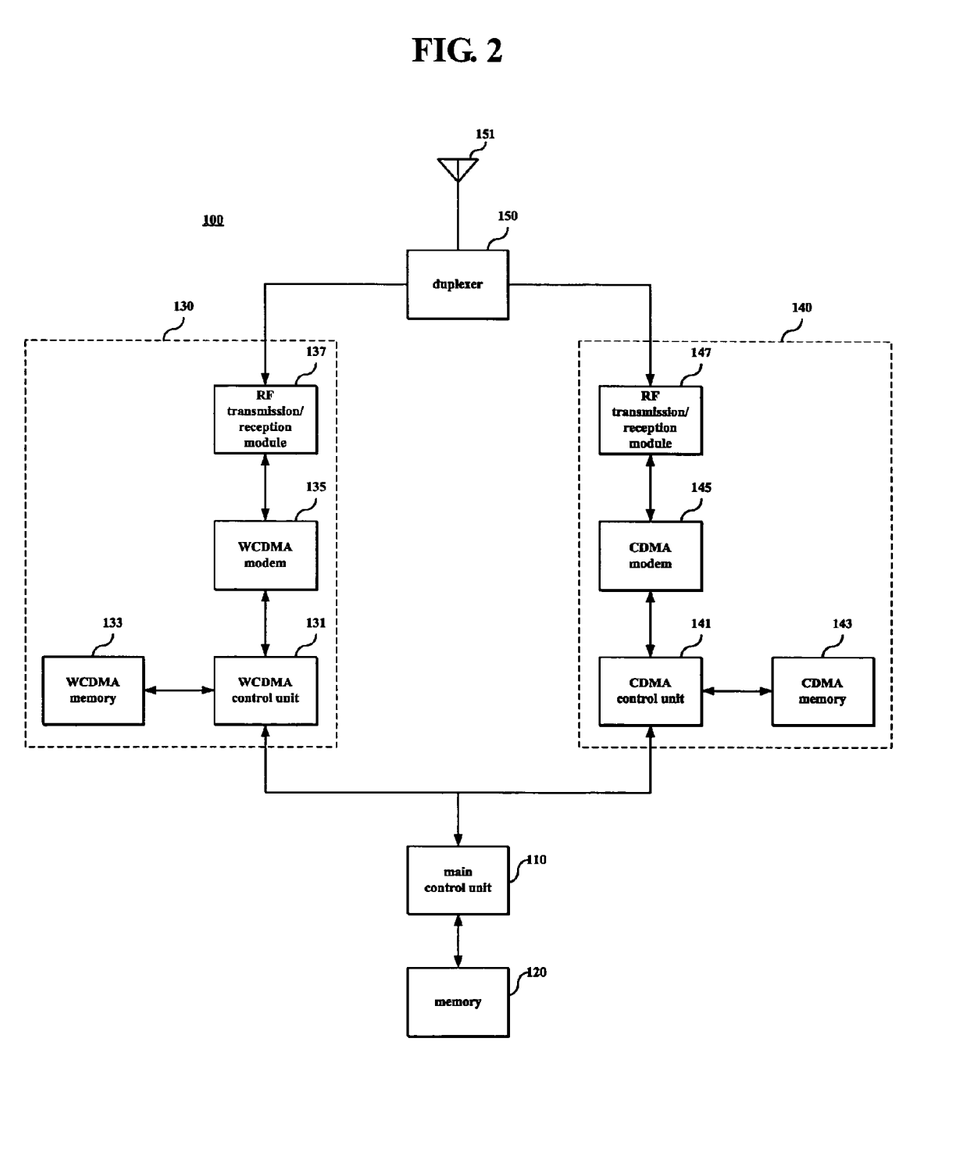
FIG. 2 is a schematic diagram illustrating parts related to the handover from the WCDMA system to the CDMA system in a multi-mode mobile communication terminal.

FIG. 2 is a schematic diagram illustrating parts related to the handover from the WCDMA system 400 to the CDMA system 500 in the multi-mode mobile communication terminal 100. The multi-mode mobile communication terminal 100 capable of operating in two or more modes is equipped with circuits (i.e., modules) for supporting operations in respective modes.

The present invention targets a mobile communication terminal that can be operated in at least WCDMA and CDMA modes. Accordingly, the multi-mode mobile communication terminal 100 of the present invention includes a WCDMA module 130 and a CDMA module 140. The terminal 100 of the present invention further includes a main control unit 110 for controlling operations in both modes and memory 120 for storing program code and data required by the main control unit 110. The modules 130 and 140 are connected to an antenna 151 through a duplexer 150. In general, both modules 130 and 140 are not activated at the same time, and the duplexer 150 separates the transmission and reception signals of each module.

The WCDMA module 130 includes an RF transmission/reception module 137, a WCDMA modem 135, a WCDMA control unit 131, and a WCDMA memory 133. The CDMA module 140 includes an RF transmission/reception module 147, a CDMA modem 145, a CDMA control unit 141, and a CDMA memory 143. These elements may be separately implemented with a plurality of Integrated Circuit (IC) chips or Monolithic Microwave ICs (MMICs), or with a single chip or several chips.

Figure 3:
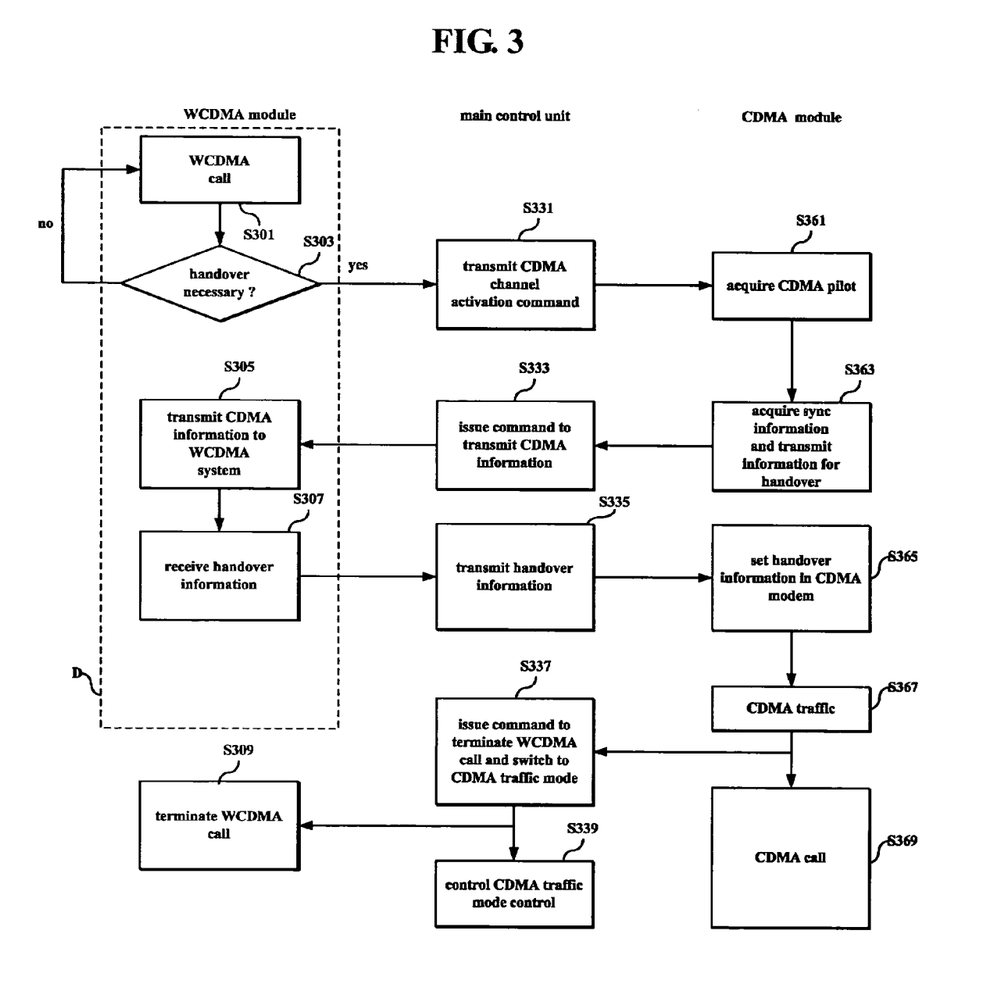
FIG. 3 is a flowchart illustrating a method of performing the handover according to the present invention.
Figure 4:
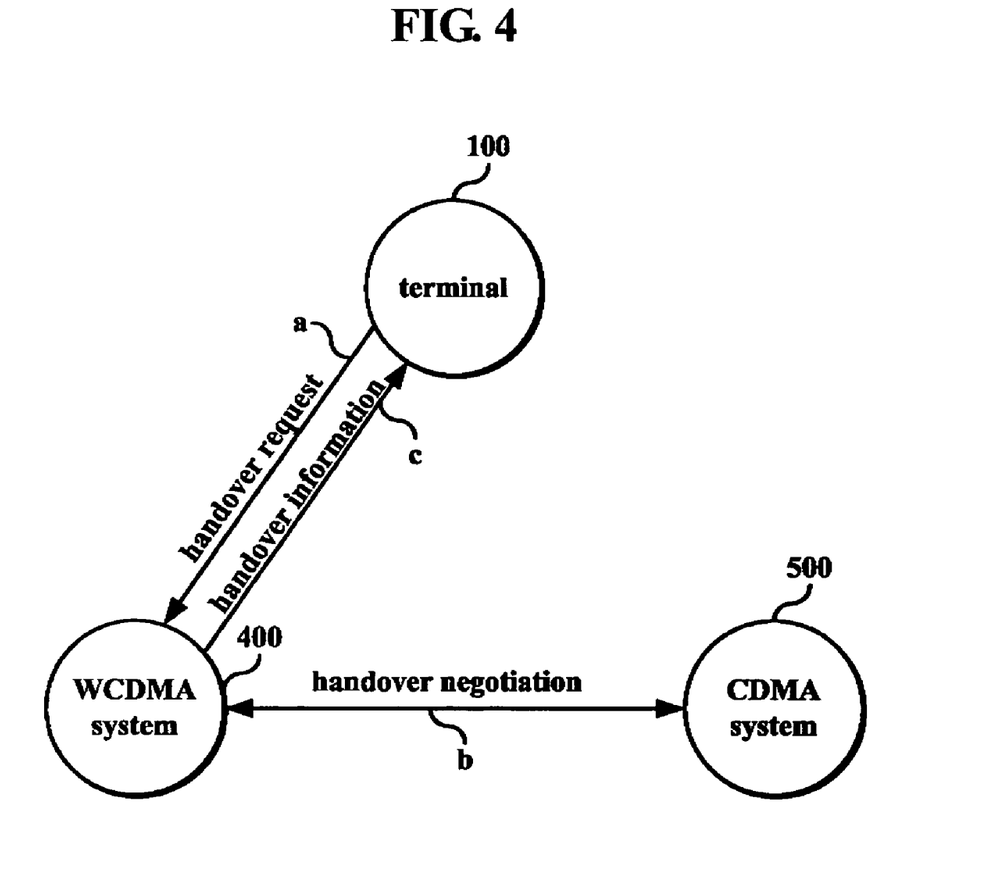
FIG. 4 is a diagram showing the data transmission and reception between the terminal, the WCDMA system and the CDMA system during the handover process according to the present invention.

With reference to FIGS. 3 and 4, a handover process according to an embodiment of the present invention is described in detail below.

A multi-mode mobile communication terminal 100 of the present invention running in a WCDMA mode determines whether a handover is necessary while monitoring various pilot signals during a call. In the present invention, the terminal 100 determines whether handover is necessary while monitoring pilot signals during a call at step S301 in the WCDMA area A using the WCDMA module 130. The terminal 100 of the present invention determines whether a handover to the CDMA system 500, in addition to a general handover within the WCDMA system 400, is necessary at step S303. When the intensity of a WCDMA signal from the WCDMA base station 200 of the cell to which the terminal 100 pertains is equal to or lower than a certain level and there is no WCDMA signal from a neighboring cell, it may be determined that a handover to the CDMA system 500 is necessary.

If a handover to the CDMA system is necessary, the WCDMA control unit 131 of the terminal 100 notifies the main control unit 110 of the necessity for a handover to the CDMA system 500. Subsequently, the main control unit 110 determines whether the terminal 100 can be operated in a CDMA mode, although not illustrated in the drawing. If it is determined that the terminal 100 cannot be operated in a CDMA mode, the main control unit 110 terminates the ongoing handover procedure. For example, if it is determined that a mobile communication terminal is set to a WCDMA-only-mode or is situated in a location where the terminal cannot be operated in a CDMA mode, the handover process to a CDMA system may be stopped. Alternatively, whether a handover to the CDMA system is currently available may be inquired from the WCDMA system 400 through the WCDMA module 130.

The main control unit 110 of the terminal 100, which is notified of the necessity for a handover to the CDMA system 500, activates the CDMA module 140 at step S331. Then, the CDMA module 140 attempts to acquire a pilot signal from the CDMA system 500 at step S361, and receives a sync signal if the pilot signal has been acquired from the CDMA system 500. In this case, the pilot signal and the sync signal may be acquired with reference only to a primary frequency so as to perform a quick handover operation. If the sync signal is received from the CDMA system 500, information for handover, including frequency information, Pseudo Noise (PN) offset information and pilot intensity information, may be acquired based on the sync signal. The CDMA control unit 141 of the CDMA module 140 transmits the signal to the main control unit 110 at step S363.

After transmitting the information for a handover to the main control unit 110 of the terminal 100, the CDMA module 140 continues an initializing procedure and enters into an idle state. Even though the terminal enters into the idle state after the initialization of the CDMA module, the terminal does not perform location registering in the CDMA system 500. Further, an idle handover may not be performed until the ongoing handover is completed.

The CDMA control unit 131 of the CDMA module 130 of the terminal 100 may activate a timer after transmitting the handover information to the main control unit 110, and cancel the handover process to the CDMA system 500 if the CDMA control unit 131 does not receive the handover information from the WCDMA system 400 within a certain period of time. Alternatively, it is possible that the main control unit 110, which has received information for handover from the CDMA control unit 131, activates a timer, and cancels the handover process to the CDMA system 500 if the handover information from the WCDMA system 400 is not received within a certain period of time.

The main control unit 110 of the terminal 100, which has received the handover information from the CDMA control unit 141, transmits the handover information to the WCDMA control unit 131 at step S333, and the WCDMA control unit 131 requests the handover to the CDMA system 500 from the WCDMA system 400 while transmitting the handover information to the WCDMA system 400 indicated as arrow "a" in FIG. 4.

The WCDMA system 400 then negotiates with the CDMA system 500 about the handover, sets various parameters for the handover of the terminal 100 indicated as arrow "b" in FIG. 4, and transmits corresponding information to the terminal 100 indicated as arrow "c" in FIG. 4. The corresponding information may include CDMA channel information, frame offset information, code information and initial information for power control-related information.

The WCDMA control unit 131 of the terminal 100, which has received the handover information from the WCDMA system 400, transmits the handover information to the main control unit 110 of the terminal 100 at step S307, and the main control unit 110 transmits the handover information to the CDMA control unit 141 at step S335. By setting the received information in CDMA modem 145 of the CDMA module 140 at step S365, the CDMA control unit 141 directly enters into a communication channel determined through the consultation between the WCDMA system 400 and the CDMA system 500 at step S367. When the CDMA module 140 enters into a communication state, the main control unit 110 commands the WCDMA control unit 131 to terminate the WCDMA call and sets necessary parameters of the resources suitable to a CDMA mode at step S337 so that the WCDMA control unit 131 terminates the WCDMA call at step S309, and the main control unit 110 controls the terminal in a CDMA mode at step S339, thus performing a CDMA call through the CDMA module 140 at step S369. As a result, a call originated at the WCDMA system 400 continues to be maintained by the CDMA system 500 without being disconnected.

In the above-described embodiment, when the intensity of a received WCDMA signal decreases to or below a certain level during a call through the WCDMA system 400, the CDMA modem 141 acquires a sync signal, obtains information required for a handover, and then performs a handover procedure in conjunction with the WCDMA system 400. In the meantime, since a period of time is required until the CDMA modem 145 acquires the sync signal, the case where the intensity of the WCDMA signal is recovered may occur during the acquisition of the CDMA sync signal.

Figure 5:
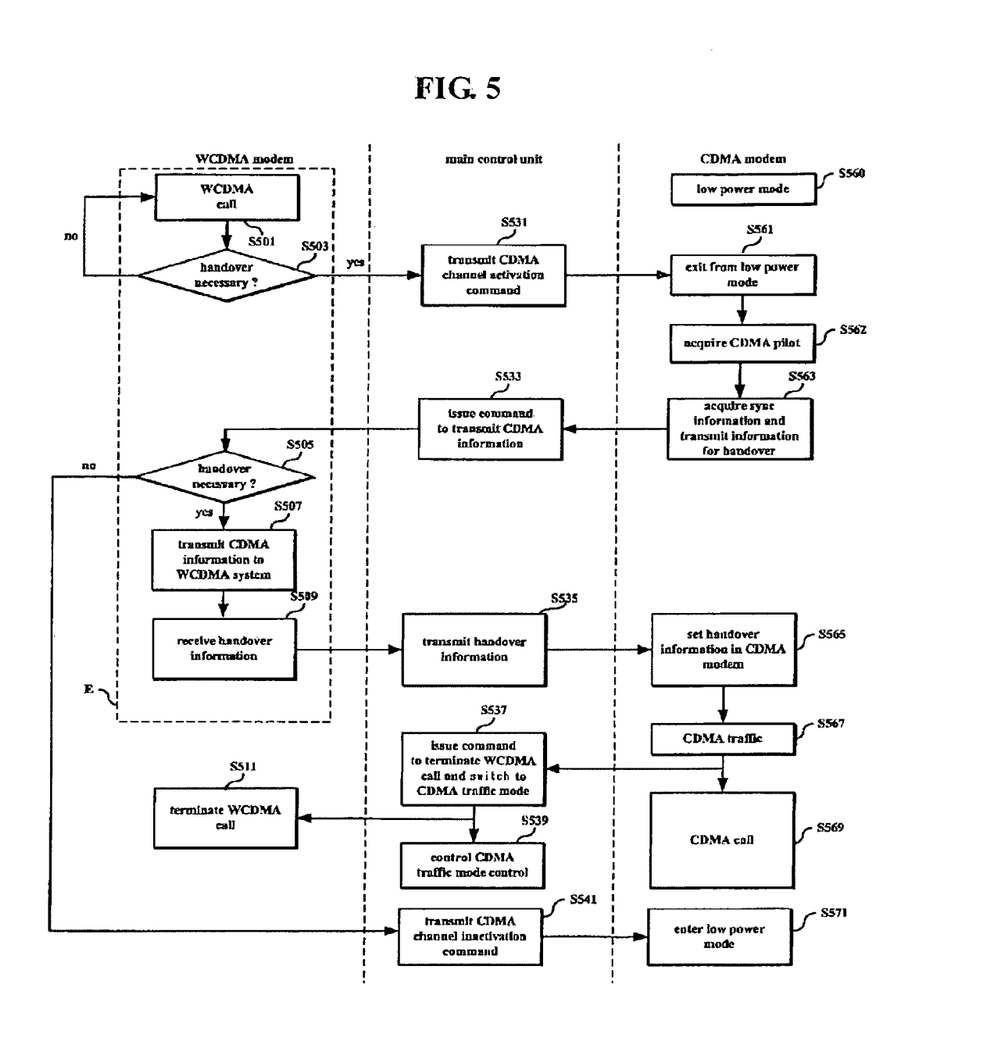
FIG. 5 is a flowchart illustrating a method of performing a handover according to a second embodiment of the present invention.

An embodiment, in which a WCDMA mode is maintained rather than being converted to a CDMA mode so as to prepare for the above-described case when the intensity of the WCDMA signal is recovered during switching from a WCDMA mode to a CDMA mode, is illustrated in FIG. 5.

A multi-mode mobile communication terminal 100 of the present invention running in a WCDMA mode determines whether a handover is necessary while monitoring various pilot signals during a call. In the present invention, the terminal 100 determines whether a handover is necessary while monitoring pilot signals during a call at step S501 in the WCDMA area A using the WCDMA module 130. Meanwhile, in this case, the CDMA modem 145 may be in a low power mode at step S560.

Moreover, the terminal 100 of the present invention determines whether a handover to the CDMA system 500, in addition to a general handover within the WCDMA system 400, is necessary at step S503. When the intensity of a WCDMA signal from the WCDMA base station 200 of the cell to which the terminal 100 pertains is equal to or lower than a certain level and there is no WCDMA signal from a neighboring cell, it can be determined that a handover to the CDMA system is necessary.

If it is determined that handover to the CDMA system 500 is necessary, the WCDMA control unit 131 notifies the main control unit 110 of the necessity for a handover to the CDMA system 500. Subsequently, the main control unit 110 determines whether the terminal 100 can be operated in a CDMA mode, although not illustrated in the drawing. If it is determined that the terminal 100 cannot be operated in a CDMA mode, the main control unit 110 terminates the ongoing handover procedure. For example, if a mobile communication terminal is set to a WCDMA-only-mode or is situated in a location where the terminal cannot be operated in a CDMA mode, the handover process to the CDMA system 500 may be stopped. Alternatively, whether a handover to the CDMA system 500 is currently available may be inquired from the WCDMA system 400 through the WCDMA module 130.

The main control unit 110 of the terminal 100 of the present invention, which is notified of the necessity for a handover to the CDMA system 500, transmits a channel activation signal to the CDMA module 140 at step S531. Then, the CDMA module 140 exits from the low power mode at step S561, attempts to acquire a pilot signal from the CDMA system at step S562, and receives a sync signal if the pilot signal has been acquired from the CDMA system 500. In this case, the pilot signal and the sync signal may be acquired with reference only to a primary frequency, so as to perform a quick handover operation. If the sync signal is received from the CDMA system 500, the handover information, including a frequency, PN offset information and pilot intensity information, may be acquired based on the sync signal. The CDMA control unit 141 transmits the signal to the main control unit 110 at step S563.

Meanwhile, after transmitting the handover information to the main control unit 110 of the terminal 100, the CDMA module 140 continues an initializing procedure and enters into an idle state. Even though the terminal enters into the idle state after the initialization of the CDMA module 140, the terminal does not register a location in the CDMA system 500. Further, an idle handover is not performed until the ongoing handover is completed.

The CDMA control unit 131 of the terminal 100 of the present invention activates a timer after transmitting the handover information to the main control unit 110, and cancels the handover process to the CDMA system 500 if the CDMA control unit 131 does not receive the handover information from the WCDMA system 400 within a certain period of time. Alternatively, it is possible that the main control unit 110, which has received the handover information, activates a timer, and cancels the handover process to the CDMA system 500 if the CDMA control unit 131 does not receive the handover information from the WCDMA system 400 within a certain period of time.

The main control unit 110 of the terminal 100 of the present invention, which has received the handover information from the CDMA control unit 141, transmits the handover information to the WCDMA control unit 131 at step S533, and the WCDMA control unit 131 determines again whether the handover to the CDMA system is still necessary at step S505.

If it is determined that the handover to the CDMA system 500 is still necessary, the terminal 100 requests the handover to the CDMA system 500 from the WCDMA system 400 while transmitting the handover information to the WCDMA system 400 at step S507 indicated as arrow "a" in FIG. 4.

Then, the WCDMA system 400 negotiates with the CDMA system 500 about the handover, sets various parameters for the handover of the terminal 100 indicated as arrow "b" in FIG. 4, and transmits corresponding information to the terminal 100 indicated as arrow "c" in FIG. 4. The corresponding information may include CDMA channel information, frame offset information, code information and initial information for power control-related information.

The WCDMA control unit 131, which has received the handover information from the WCDMA system 400, transmits the handover information to the main control unit 110 at step S509, and the main control unit 110 transmits the handover information to the CDMA control unit 141 at step S535. By setting the received information in the CDMA modem 145 at step S565, the CDMA control unit 141 directly enters into a communication channel determined through the consultation between the WCDMA system 400 and the CDMA system 500 at step S567. The CDMA control unit 141 notifies the CDMA system 500 of the successful completion of the handover, and waits for a response confirming the completion of the handover.

If the response confirming the completion of the handover is received from the CDMA system 500, the main control unit 110 commands the WCDMA control unit 131 to terminate the WCDMA call and sets necessary parameter of the resources suitable to a CDMA mode at step S511 so that the WCDMA control unit 131 terminates the WCDMA call at step S537, and the main control unit 110 controls the terminal in a CDMA mode at step S539, thus performing a CDMA call through the CDMA module 140 at step S569. As a result, a call originated in the WCDMA system 400 continues to be maintained in the CDMA system 500 without being disconnected.

In case where the intensity of a WCDMA signal recovers to or above a certain level and, thus, it is determined that a handover to the CDMA system 500 is not necessary, the WCDMA module 130 notifies the main control unit 110 of the fact, and the main control unit 110 transmits a CDMA inactivation signal to the CDMA module 140 at step S541. Then, the CDMA module 140 enters into a low power mode again at step S571, thus terminating the switching process to a CDMA mode.

Figure 6:
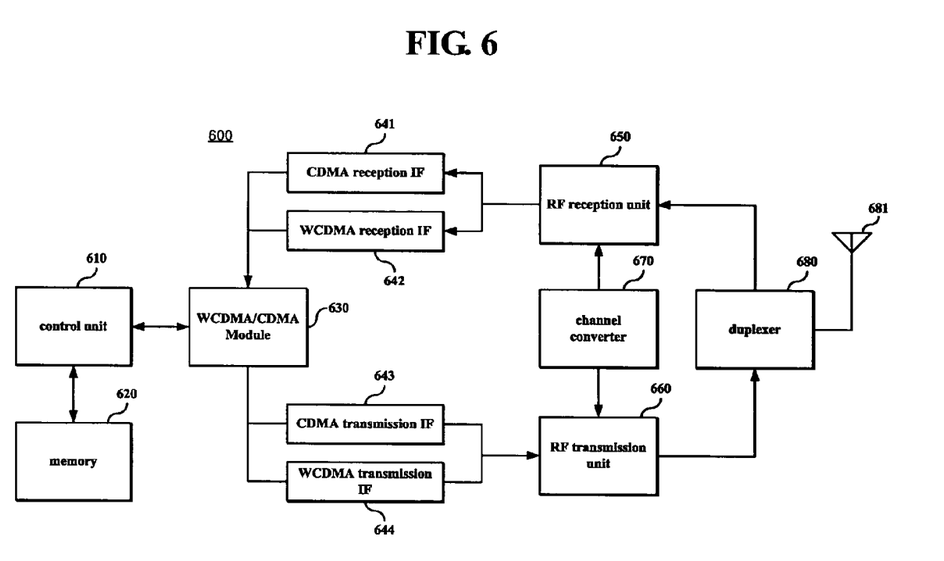
FIG. 6 is a schematic block diagram showing parts related to the handover from a WCDMA system to a CDMA system in a multi-mode mobile communication terminal in which RF transmission and reception units are shared for WCDMA and CDMA communications.

Although in the above description, the case where two RF transmission/reception units are provided for the WCDMA and CDMA communications, respectively, has been described, it is possible to design the terminal 100 so that RF transmission and reception units are shared for the WCDMA and CDMA communications. FIG. 6 is a schematic block diagram showing parts of a multi-mode mobile communication terminal 600 related to a handover from a WCDMA system 400 to a CDMA system 500 in which RF transmission and reception units are shared for the WCDMA and CDMA communications.

According to a third embodiment of the present invention, a part of the terminal 100 in which an RF transmission/reception unit for WCDMA communication and an RF transmission/reception unit for CDMA communication are connected to a modem chip is formed in a single body. Furthermore, each of an RF reception unit 650 and an RF transmission unit 660 may be used for both the WCDMA and CDMA communications. A channel converter 670 controls whether the RF reception and transmission units 650 and 660 are used for the WCDMA or CDMA communications. A duplexer 680 allows an RF transmission signal to be transmitted to an antenna 681 and an RF reception signal to be transmitted to the RF reception unit 650.

An Intermediate Frequency (IF) signal from the RF reception unit 650 is converted into a base band frequency signal through a CDMA reception IF 641 in a CDMA mode or through a WCDMA reception IF 642 in a WCDMA mode and transmitted to a CDMA/WCDMA module 630, while a base band frequency signal from the CDMA/WCDMA module 630 is converted into an IF frequency band signal through a CDMA transmission IF 643 in a CDMA mode or through a WCDMA transmission IF 644 in WCDMA mode and transmitted to the RF transmission unit 660. Meanwhile, in case where a base band signal is converted into an RF band signal without passing through an IF stage, the CDMA reception IF 641, the WCDMA reception IF 642, the CDMA transmission IF 643, and the WCDMA transmission IF 644 can be omitted. Furthermore, the CDMA reception IF 641, the WCDMA reception IF 643, the CDMA transmission IF 643 and the WCDMA transmission IF 644 may be shared, like the RF transmission and reception units. In this case, if IF frequencies are different, the IF stage requires a channel converter.

The CDMA/WCDMA module 630 performs the processing of CDMA and WCDMA signals according to CDMA and WCDMA protocols. The multi-mode mobile communication terminal 600 of the present invention includes a control unit 610 for controlling operation in both modes and memory 620 for storing program code and data required by the control unit 610.

Figure 7:
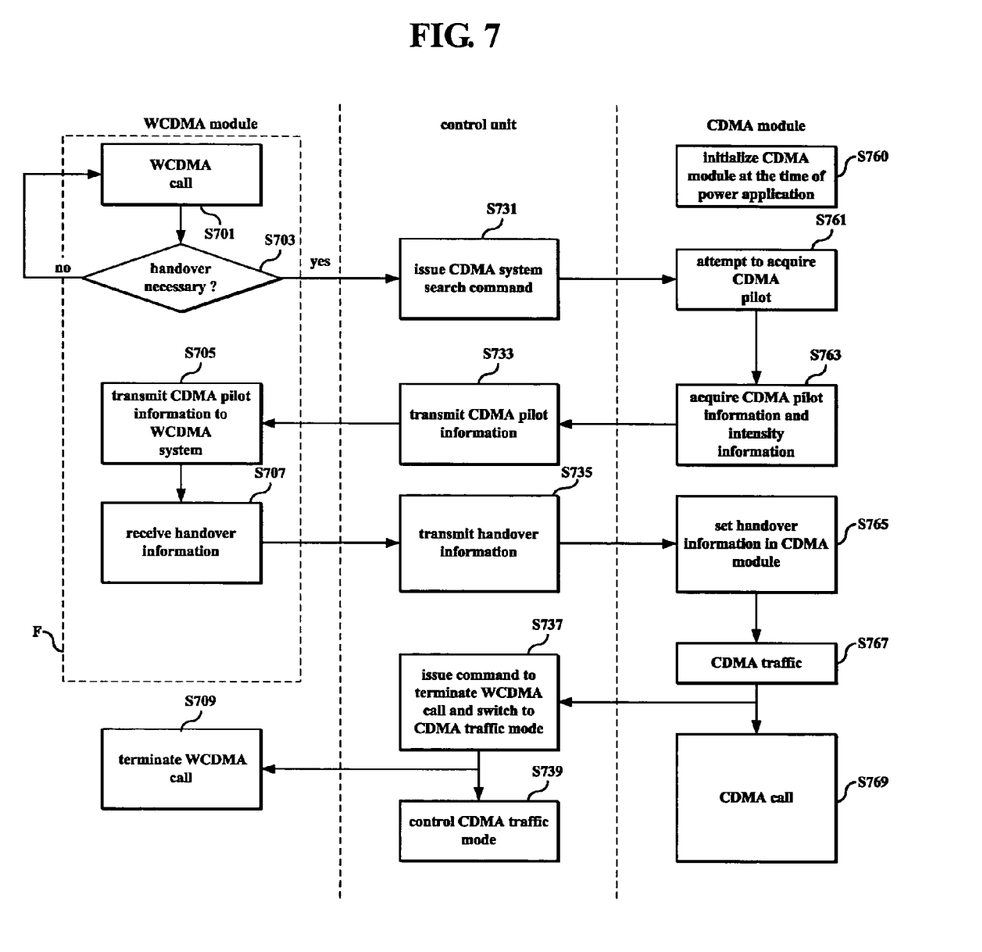
FIG. 7 is a flowchart illustrating a method of performing a handover according to a third embodiment of the present invention.

With reference to FIG. 7, a handover process according to the third embodiment of the present invention is described in detail below.

When power is applied to the multi-mode mobile communication terminal 600 of the present invention in the case where a WCDMA mode has a higher priority than a CDMA mode, the WCDMA/CDMA module 630 is initialized and enters into an idle state after performing the system setting at step S760. After passing through the initialization procedure after the application of power, the WCDMA/CDMA module 630 acquires the pilot signal of a CDMA channel and then maintains synchronization with the system using sync channel information. Thereafter, the WCDMA/CDMA module 630 may conduct a resynchronization procedure at regular intervals while switching to a WCDMA mode.

In the meantime, the terminal 600 operated in a WCDMA mode determines whether a handover is necessary while monitoring various pilot signals during a call through the WCDMA system 400 at step S701. In the present invention, the terminal 600 determines whether a handover is necessary while monitoring pilot signals during a call in the WCDMA area A using the WCDMA/CDMA module 630. The terminal 600 of the present invention determines whether a handover to the CDMA system 500, in addition to a general handover within in the WCDMA system 400, is necessary at step S703. When the intensity of a WCDMA signal from the WCDMA base station 200 of the cell to which the terminal 600 pertains is equal to or lower than a certain level and there is no WCDMA signal from a neighboring cell, it can be determined that a handover to the CDMA system 500 is necessary.

If a handover to the CDMA system 500 is necessary, the WCDMA/CDMA module 630 notifies the control unit 610 of the necessity for a handover to the CDMA system 500. Then, the control unit 610 determines whether the terminal 600 can be operated in a CDMA mode, although not illustrated in the drawing. If, for example, a mobile communication terminal is set to a WCDMA-only-mode or is not situated in a location where the terminal can be operated in a CDMA mode, the handover process to the CDMA system 500 may be stopped. Alternatively, whether a handover to the CDMA system is currently available may be inquired from the WCDMA system 400 through the WCDMA/CDMA modem 630.

The control unit 610, which is notified of the necessity for a handover to the CDMA system 500, issues a system search command to the WCDMA/CDMA module 630 and switches the channel converter 670 to a CDMA mode at step S731. Then, the WCDMA/CDMA module 630 attempts to acquire a pilot signal from the CDMA system at step S761, and acquires the pilot information and intensity information of the CDMA system 500 at step S763. In this period of time, communication through the WCDMA system 400 may be stopped a little while. The CDMA module, which has acquired the pilot information, transmits the pilot information to the control unit 610 at step S733, and the control unit 610 transmits the pilot information to the WCDMA/CDMA module 630 and returns the channel converter 670 to a WCDMA mode. Then, the WCDMA/CDMA module 630 returns to the CDMA initialization state.

The WCDMA/CDMA module 630 requests a handover to the CDMA system 500 while transmitting the received CDMA pilot information to the WCDMA system 400 indicated as arrow "a" of FIG. 4. Since the procedure of handover information transmission between the systems is similar to that set forth in the description related to FIG. 4, a detailed description thereof is omitted.

By setting the handover information received from the control unit 610 at step S765, the WCDMA/CDMA module 630 directly enters into a communication channel determined through the consultation between the WCDMA system 400 and the CDMA system 500 at step S767. When the WCDMA/CDMA module 630 enters into a communication state, the control unit 610 commands the WCDMA/CDMA module 630 to terminate the WCDMA call and sets necessary parameters of the resources suitable to a CDMA mode at step S737 so that the control unit 610 terminates the WCDMA call at step S709, and the control unit 610 controls the terminal 600 in a CDMA mode at step S739, thus performing a CDMA call through the WCDMA/CDMA module 630 at step S769. As a result, a call originated in the WCDMA system 400 continues to be maintained in the CDMA system 500 without being disconnected.

Figure 8:
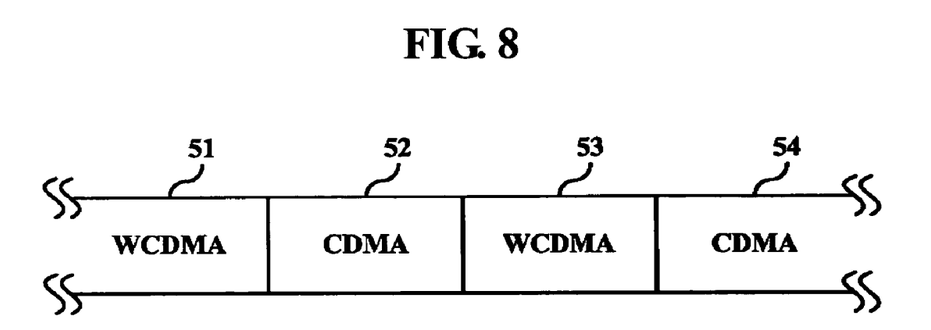
FIG. 8 is a conceptual diagram illustrating the operation of a channel converter during the handover process.

With reference to FIG. 8, the operation of the channel converter 670 of the terminal 600 during the handover process is described below. Since the RF reception and transmission units 650, 660 are shared for the WCDMA and CDMA communications in the terminal 600 of the present embodiment, the frequency of the RF reception and transmission units 650, 660 must be converted to that for the CDMA communication to acquire a CDMA signal during the WCDMA communication.

That is, during a WCDMA call, the channel converter 670 controls the RF reception and transmission units 650 and 660 in a WCDMA mode (51), and in the case of acquiring a CDMA pilot signal, the channel converter 670 converts the RF reception and transmission units 650 and 660 into a WCDMA mode (52). After the pilot signal has been acquired, the channel converter 670 converts the RF reception and transmission units 650 and 660 into a WCDMA mode (53) to allow the acquired CDMA pilot signal to be transmitted to the WCDMA system 400. When handover-related information is received from the WCDMA system 400, the channel converter converts the RF transmission and reception units 650 and 660 into CDMA mode and, thus, allows the RF transmission and reception units 650 and 660 to enter a CDMA traffic state.

In the meantime, when a WCDMA mode is temporarily converted to a CDMA mode to acquire a CDMA pilot signal, an operation may be performed the same way as in a WCDMA compressed mode.

As described above, the present invention provides a handover method that can be applied to the case where a multi-mode mobile communication terminal enters into a CDMA network from a WCDMA network. Furthermore, since a CDMA module performs the procedure necessary for a handover in conjunction with a WCDMA system after acquiring a sync signal and information required for the handover therefrom, the handover process can be performed rapidly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, while a method for switching a WCDMA call into a CDMA call is described, a method where a CDMA call is switched into a WCDMA call is easily configured.

What is claimed is:

1. A method of performing a handover from a Wideband Code Division Multiple Access (WCDMA) system to a Code Division Multiple Access (CDMA) system in a multi-mode mobile terminal having a WCDMA module and a CDMA module, comprising the steps of:
   (a) determining whether the handover to the CDMA system is necessary during a call through the WCDMA module;
   (b) acquiring a pilot signal from the CDMA system by activating the CDMA module if it is determined that the handover to the CDMA system is necessary;
   (c) receiving a sync signal if the pilot signal from the CDMA system is acquired;
   (d) transmitting information for the handover to the WCDMA system through the WCDMA module;
   (e) allowing the CDMA module to enter into a CDMA traffic state using handover information received from the WCDMA system through the WCDMA module; and
   (f) releasing a traffic state of the WCDMA module,
   wherein the steps are performed at the multi-mode mobile terminal.

2. The method as set forth in claim 1, wherein, it is determined that the handover to the CDMA system is necessary at the step (a) when an intensity of a WCDMA signal from a cell to which the multi-mode mobile terminal pertains is equal to or lower than a predetermined level and there is no WCDMA signal from a neighboring cell.

3. The method as set forth in claim 1, wherein the step (b) further comprises the steps of:
   (b-1) determining whether the multi-mode mobile terminal can be operated in a CDMA mode if the handover to the CDMA system is necessary; and
   (b-2) acquiring the pilot signal from the CDMA system by activating the CDMA module if it is determined that the multi-mode mobile terminal can be operated in the CDMA mode.

4. The method as set forth in claim 3, wherein, if the mobile terminal is set to a WCDMA-only-mode, it is determined that the mobile terminal cannot be operated in a CDMA mode at the step (b-1).

5. The method as set forth in claim 3, wherein, if the mobile terminal is not currently situated in a location where the mobile terminal can be operated in a CDMA mode, it is determined that the mobile terminal cannot be operated in a CDMA mode at the step (b-1).

6. The method as set forth in claim 1, wherein the information for handover transmitted to the WCDMA system at the step (d) includes frequency information, Pseudo Noise (PN) offset information and pilot intensity information.

7. The method as set forth in claim 1, wherein the handover information received from the WCDMA system at the step (e) includes CDMA channel information, frame offset information, code information and initial information for power control.

8. The method as set forth in claim 1, wherein the step (f) further comprises:
   (f-1) setting resources, which are required for a call, to be appropriate to a CDMA mode; and
   (f-2) releasing the traffic state of the WCDMA module.

9. The method as set forth in claim 1, further comprising the step of canceling a process of the handover to the CDMA system if the handover information is not received within a predetermined period of time after the step (d).

10. The method as set forth in claim 1, wherein, if the multi-mode mobile terminal enters into an idle state after the step (c), the multi-mode mobile terminal does not perform an idle handover before an ongoing handover is completed.

11. The method as set forth in claim 1, wherein, if the multi-mode mobile terminal enters into an idle state after the step (c), the multi-mode mobile terminal does not perform a location registering in the CDMA system.

12. The method as set forth in claim 1, wherein the activation of the CDMA module at the step (b) is to cause the CDMA module to exit from a low power mode.

13. The method as set forth in claim 1, further comprising, after the step (c), the steps of:
   determining whether a handover to the CDMA system is necessary if the sync signal is received from the CDMA system;
   performing the steps (d) to (f) if the handover to the CDMA system is necessary; and
   causing the CDMA module to enter a low power mode if the handover to the CDMA system is not necessary.

14. The method as set forth in claim 13, wherein:
   the step (e) further comprises the step of notifying the CDMA system of a successful completion of the handover; and
   the process proceeds to the step (f) if a response confirming the successful completion of the handover is received from the CDMA system.

15. A method of performing a handover from a WCDMA system to a CDMA system in a multi-mode mobile terminal in which Radio Frequency (RF) transmission and reception units are shared by a WCDMA/CDMA module, comprising the steps of:
   (a) determining whether the handover to the CDMA system is necessary during a call through the WCDMA/CDMA module;
   (b) acquiring a pilot signal from the CDMA system by setting the RF transmission and reception units to a CDMA mode and activating the WCDMA/CDMA module if it is determined that the handover to the CDMA system is necessary;
   (c) setting the RF transmission and reception units to a WCDMA mode and transmitting acquired CDMA pilot signal to the WCDMA system through the WCDMA/CDMA module if the pilot signal from the CDMA system is acquired;
   (d) setting the RF transmission and reception units to a CDMA mode and causing the WCDMA/CDMA module to enter a CDMA traffic state using handover information if the handover information is received from the WCDMA system through the WCDMA/CDMA module; and
   (e) releasing a traffic state of the WCDMA/CDMA module,
   wherein the steps are performed at the multi-mode mobile terminal.

16. The method as set forth in claim 15, wherein, it is determined that the handover to the CDMA system is necessary at the step (a) when an intensity of a WCDMA signal from a cell to which the multi-mode mobile terminal pertains is equal to or lower than a predetermined level and there is no WCDMA signal from a neighboring cell.

17. The method as set forth in claim 15, wherein the step (b) further comprises the steps of:
- (b-1) determining whether the multi-mode mobile terminal can be operated in a CDMA mode if it is determined that the handover to the CDMA system is necessary; and
- (b-2) acquiring the pilot signal from the CDMA system by activating the WCDMA/CDMA module if it is determined that the mobile terminal can be operated in the CDMA mode.

18. The method as set forth in claim 17, wherein, if the mobile terminal is set to a WCDMA-only-mode, it is determined that the mobile terminal cannot be operated in a CDMA mode at the step (b-1).

19. The method as set forth in claim 17, wherein, if the mobile terminal is currently situated in a location where the mobile terminal can not be operated in a CDMA mode, it is determined that the mobile terminal cannot be operated in the CDMA mode at the step (b-1).

20. The method as set forth in claim 15, wherein, when power is applied to the mobile terminal, the WCDMA/CDMA module is initialized and is kept synchronized with the system.

21. The method as set forth in claim 20, wherein a procedure of resynchronizing with the CDMA system is performed at regular intervals during a WCDMA mode operation.

22. The method as set forth in claim 15, wherein the handover information received from the WCDMA system at the step (d) includes CDMA channel information, frame offset information, code information and early stage power control-related information.

23. The method as set forth in claim 15, wherein the step (e) further comprises:
- (e-1) setting resources, which are required for a call, to be appropriate to a CDMA mode; and
- (e-2) releasing the traffic state of the WCDMA/CDMA module.

24. A computer-readable medium for performing a handover from a Wideband Code Division Multiple Access (WCDMA) system to a Code Division Multiple Access (CDMA) system in a multi-mode mobile terminal having a WCDMA module and a CDMA module, the medium comprising code that, when executed, causes a computer to carry out the steps of:
- (a) determining whether the handover to the CDMA system is necessary during a call through the WCDMA module;
- (b) acquiring a pilot signal from the CDMA system by activating the CDMA module if it is determined that the handover to the CDMA system is necessary;
- (c) receiving a sync signal if the pilot signal from the CDMA system is acquired;
- (d) transmitting information for the handover to the WCDMA system through the WCDMA module;
- (e) allowing the CDMA module to enter into a CDMA traffic state using handover information received from the WCDMA system through the WCDMA module; and
- (f) releasing a traffic state of the WCDMA module, wherein the steps are performed at the multi-mode mobile terminal.

* * * * *